(12) United States Patent
Lin

(10) Patent No.: US 11,968,481 B2
(45) Date of Patent: Apr. 23, 2024

(54) VIDEO PLAYBACK METHOD AND TERMINAL DEVICE

(71) Applicant: VIVO MOBILE COMMUNICATION CO., LTD., Dongguan (CN)

(72) Inventor: Xiongzhou Lin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 192 days.

(21) Appl. No.: 17/385,944

(22) Filed: Jul. 27, 2021

(65) Prior Publication Data

US 2021/0360216 A1 Nov. 18, 2021

Related U.S. Application Data

(63) Continuation of application No. PCT/CN2020/073548, filed on Jan. 21, 2020.

(30) Foreign Application Priority Data

Jan. 31, 2019 (CN) .......................... 201910100617.3

(51) Int. Cl.
*H04N 9/87* (2006.01)
*G06F 3/14* (2006.01)

(52) U.S. Cl.
CPC .............. *H04N 9/87* (2013.01); *G06F 3/1423* (2013.01)

(58) Field of Classification Search
CPC ...... H04N 21/8549; H04N 9/87; H04N 21/84; H04N 21/433; H04N 21/81;

(Continued)

(56) References Cited

U.S. PATENT DOCUMENTS

2005/0155070 A1 7/2005 Slaughter
2015/0378561 A1* 12/2015 Ollinger ............... G06Q 30/016
707/769

(Continued)

FOREIGN PATENT DOCUMENTS

CN 101251993 A 8/2008
CN 103546775 A 1/2014

(Continued)

OTHER PUBLICATIONS

International Search Report issued in corresponding International Application No. PCT/CN2020/073548, dated April 9. 2020, 6 pages.

(Continued)

*Primary Examiner* — Thai Q Tran
*Assistant Examiner* — Nienru Yang
(74) *Attorney, Agent, or Firm* — IPX PLLC

(57) ABSTRACT

Embodiments of the present disclosure provide a video playback method and a terminal device. The method is applied to a first terminal device including N screens, and includes: obtaining M video files and configuration information of the M video files, where the configuration information is used for indicating a screen identifier associated with each of the M video files; and playing K video files in the M video files on K screens in the N screens according to the configuration information, where both N and K are positive integers, and M is an integer greater than or equal to 2.

20 Claims, 9 Drawing Sheets

A first terminal device obtains M video files and configuration information of the M video files — 201

The first terminal device plays K video files in the M video files on K screens in N screens according to the configuration information — 202

(58) Field of Classification Search
CPC .... H04N 21/8405; G06F 3/1423; G09G 5/12; G09G 5/18; G09G 2360/04; G09G 2360/06; G09G 2360/10
USPC ........................................................ 386/230
See application file for complete search history.

(56) References Cited

U.S. PATENT DOCUMENTS

| | | | | |
|---|---|---|---|---|
| 2016/0041715 | A1* | 2/2016 | Sirpal | G06F 1/1616 |
| | | | | 715/770 |
| 2017/0269976 | A1* | 9/2017 | Venkataraman | G06F 11/3438 |

FOREIGN PATENT DOCUMENTS

| | | | |
|---|---|---|---|
| CN | 103810959 | A | 5/2014 |
| CN | 104540027 | A | 4/2015 |
| CN | 105872815 | A | 8/2016 |
| CN | 107450874 | A | 12/2017 |
| CN | 107529086 | A | 12/2017 |
| CN | 108012182 | A | 5/2018 |
| CN | 109086020 | A | 12/2018 |
| CN | 109922380 | A | 6/2019 |
| JP | H10200960 | A | 7/1998 |
| WO | 2010003325 | A1 | 1/2010 |

OTHER PUBLICATIONS

Search report issued in related Chinese Application No. 201910100617.3, dated Mar. 14, 2020, 9 pages.
First Office Action issued in related Chinese Application No. 201910100617.3, dated Mar. 4, 2020, 9 pages.

\* cited by examiner

VIDEO PLAYBACK METHOD AND TERMINAL DEVICE

CROSS-REFERENCE TO RELATED APPLICATIONS

This application is a bypass continuation of PCT Application No. PCT/CN2020/073548 filed Jan. 21, 2020, which claims priority to Chinese Patent Application No. 201910100617.3 filed in China on Jan. 31, 2019, both of which are incorporated herein by reference in their entireties.

TECHNICAL FIELD

Embodiments of the present disclosure relate to the field of terminal technologies, and in particular, to a video playback method and a terminal device.

BACKGROUND

Generally, a user may record a current screen by using a terminal device (that is, the terminal device records a picture displayed on the current screen).

Currently, when a user performs screen recording by using a multi-screen terminal device, the user may first record a picture of one screen, and after finishing screen recording, record a picture of another screen until the user finishes the recording on a picture on each screen according to requirement.

After the screen recording is finished, if the user intends to view a plurality of recorded video files, the user needs to manually search each file in the plurality of video files. If the user clicks a video 1, the terminal device plays the video 1. If the user needs to view a video 2, that is, first finds the video 2 and then clicks the video 2, the terminal device stops playing the video 1 and then playing the video 2. In this way, a manner of playing the video file is relatively single.

SUMMARY

Embodiments of the present disclosure provide a video playback method and a terminal device, to resolve a problem that a manner of playing a video file is relatively single.

To resolve the foregoing technical problem, the embodiments of the present disclosure are implemented as follows:

According to a first aspect, an embodiment of the present disclosure provides a video playback method, applied to a terminal device including N screens. The method includes: obtaining M video files and configuration information of the M video files, where the configuration information is used for indicating a screen identifier of each of the M video files; and playing K video files in the M video files on K screens in the N screens according to the configuration information, where both N and K are positive integers, and M is an integer greater than or equal to 2.

According to a second aspect, an embodiment of the present disclosure further provides a terminal device, including N screens. The terminal device includes: an obtaining module and a playback module, where the obtaining module is configured to obtain M video files and configuration information of the M video files, where the configuration information is used for indicating a screen identifier of each of the M video files; and the playback module is configured to play K video files in the M video files on K screens in the N screens according to the configuration information obtained by the obtaining module, where both N and K are positive integers, and M is an integer greater than or equal to 2.

According to a third aspect, an embodiment of the present disclosure provides a terminal device, including a processor, a memory, and a computer program stored in the memory and runnable on the processor, where the computer program, when executed by the processor, implements the steps of the video playback method according to the first aspect.

According to a fourth aspect, an embodiment of the present disclosure provides a computer-readable storage medium, where the computer-readable storage medium stores a computer program, and the computer program, when executed by a processor, implements the steps of the video playback method according to the first aspect.

In this embodiment of the present disclosure, first, the first terminal device including N screens obtains M video files and configuration information of the M video files. Then, the first terminal device plays K video files in the M video files on K screens in the N screens according to the configuration information. Because the configuration information may be used for indicating the screen identifier associated with each of the M video files, the first terminal device may determine a display position of each video file on the K screens based on the screen identifier in the configuration information, so that when the first terminal device plays the K video files in the K screens, a user does not need to manually search each video file, and the user does not need to re-search the video file and then click to play the video file each time during playback. For example, when the M video files are video files obtained through screen recording by a multi-screen terminal device, the first terminal device can directly play the K video files in the M video files on the K screens of the first terminal device according to the screen identifiers corresponding to the recording screens, and the user does not need to search another video file after one video file is played. Therefore, the video playback manner provided in this embodiment of the present disclosure is more flexible and convenient.

DETAILED DESCRIPTION

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be noted that "/" in this specification represents or. For example, A/B may indicate A or B; "and/or" in this specification merely describes an association relationship between associated objects, and indicates that there may be three relationships. For example, A and/or B may indicate three cases: only A exists, both A and B exist, and only B exists. The term "a plurality of" refers to two or more.

In the specification and claims of the present disclosure, the terms such as "first" and "second" are used for distinguishing different objects, but are not used for describing a specific sequence of the objects. For example, a first screen, a second screen, and the like are used for distinguishing different screens, but are not used for describing a particular sequence of the screens.

It should be noted that in this embodiment of the present disclosure, the term such as "exemplary" or "for example" is used for representing an example, an illustration, or a description. Any embodiment or design solution described as "exemplary" or "for example" in this embodiment of the present disclosure should not be explained as being more preferred or having more advantages than another embodiment or design solution. Exactly, the use of the term such as "exemplary" or "for example" is intended to present a related concept in a specific manner.

The terminal device in the embodiments of the present disclosure may be a terminal device with an operating system. The operating system may be an Android operating system, or may be an iOS operating system, or may be another possible operating system, which is not specifically limited in this embodiment of the present disclosure.

The following uses the Android operating system as an example to describe a software environment to which a video playback method provided in the embodiments of the present disclosure is applied.

Figure 1:
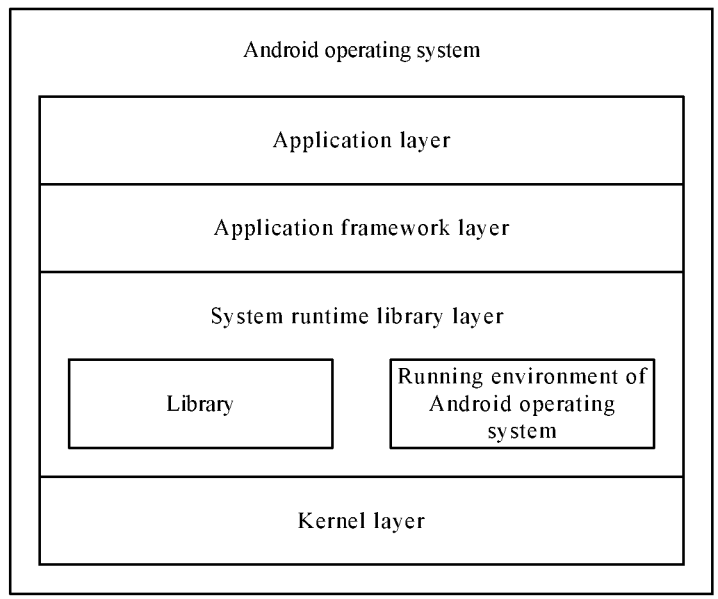
FIG. 1 is a schematic diagram of an architecture of a possible Android operating system according to an embodiment of the present disclosure.

FIG. 1 is a schematic diagram of an architecture of a possible Android operating system according to an embodiment of the present disclosure. In FIG. 1, the architecture of the Android operating system includes 4 layers: an application layer, an application framework layer, a system runtime library layer, and a kernel layer (specifically, may be a Linux kernel layer).

The application layer includes various applications in the Android operating system (including system applications and third-party applications).

The application framework layer is a framework of applications. Developers can develop some applications based on the application framework layer while following a development principle of the framework of the applications.

The system runtime library layer includes a library (also referred to as a system library) and a running environment of the Android operating system. The library mainly provides various resources required for the Android operating system. The running environment of the Android operating system is used for providing a software environment for the Android operating system.

The kernel layer is an operating system layer of the Android operating system, and is a lowest layer of software levels of the Android operating system. The kernel layer provides core system services and hardware-related drivers for the Android operating system based on the Linux kernel.

The Android operating system is used as an example. In this embodiment of the present disclosure, based on the system architecture of the Android operating system shown in FIG. 1, developers can develop a software program that implements the video playback method provided in the embodiments of the present disclosure, so that the video playback method can be performed based on the Android operating system shown in FIG. 1. That is, by running the software program in the Android operating system, a processor or a terminal device can implement the video playback method provided in the embodiments of the present disclosure.

Figure 2:
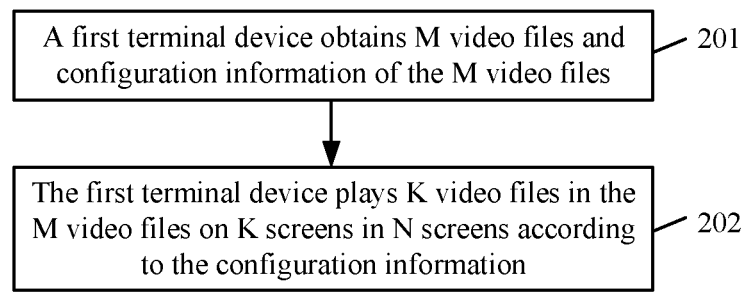
FIG. 2 is a schematic flowchart of a video playback method according to an embodiment of the present disclosure.

The video playback method in the embodiments of the present disclosure is described below with reference to FIG. 2. FIG. 2 is a schematic flowchart of a video playback method according to an embodiment of the present disclosure. As shown in FIG. 2, the video playback method includes step 201 and step 202:

Step 201. A first terminal device obtains M video files and configuration information of the M video files.

The configuration information is used for indicating a screen identifier associated with each of the M video files, and M is an integer greater than or equal to 2. The first terminal device includes N screens, and N is positive integer.

Exemplarily, when the M video files are video files obtained through screen recording, the configuration information may indicate a screen identifier of a screen corresponding to recording each of the M video files.

Figure 3:
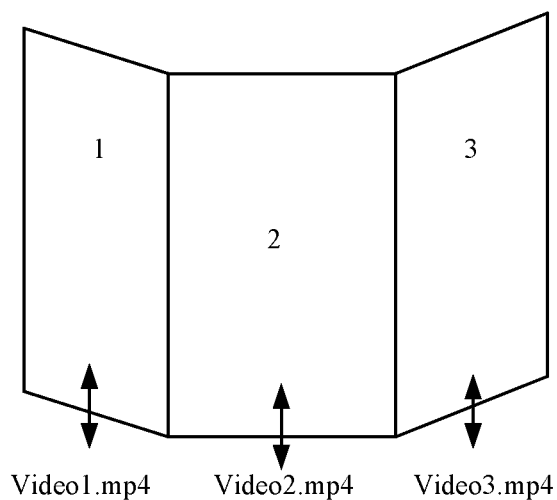
FIG. 3 is a schematic diagram of a correspondence between a screen and a video file according to an embodiment of the present disclosure.

FIG. 3 is a schematic diagram of a correspondence between a screen and a video file according to an embodiment of the present disclosure. As shown in FIG. 3, a video file recorded on a screen 1 is video1.mp4, a video file recorded on a screen 2 is video2.mp4, and a video file recorded on a screen 3 is video3. mp4.

Exemplarily, the first terminal device may obtain one multi-screen recording file. The multi-screen recording file includes the M video files and configuration information of the M video files. The first terminal device may obtain the M video files and the configuration information of the M video files from the multi-screen recording file.

Exemplarily, the configuration information may be in the following form:

```
{
{ "screen1": "video1.mp4" },
{ "screen2": "video2.mp4" },
{ "screen3": "video3.mp4" },
{ "screenM": "videoM.mp4" }
}
``` where screenM is an $M^{th}$ screen, and videoM.mp4 is a video file corresponding to the $M^{th}$ screen.

Figure 4:
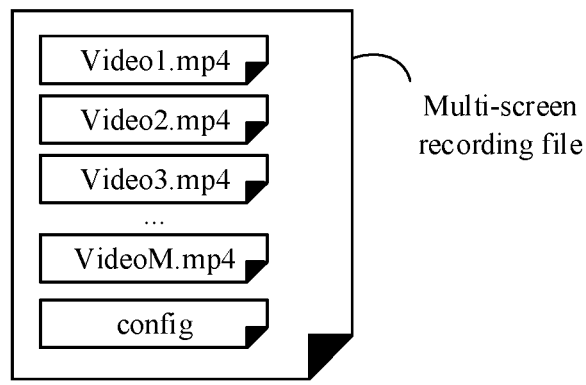
FIG. 4 is a schematic diagram of a form of a multi-screen recording file according to an embodiment of the present disclosure.

Exemplarily, the multi-screen recording file may be in a form shown in FIG. 4. The multi-screen recording file includes M video files and configuration information of the M video files, where the M video files include: video1.mp4, video2.mp4, video3.mp4 to videoM.mp4, and the configuration information is a "config" file shown in the figure.

Step 202. The first terminal device plays K video files in the M video files on K screens in N screens according to the configuration information.

K is a positive integer.

Optionally, the first terminal device may sequentially play the K video files according to a sequence of screen identifiers from small to large, from large to small, or randomly selected, or may simultaneously play the K video files, or certainly, may play the K video files according to a playback sequence set by a user. This is not specifically limited in this embodiment of the present disclosure.

It should be noted that when M>N, that is, when the number of video files is greater than the number of screens of the first terminal device, the first terminal device may start all screens to play video files (that is, K=N), or may play video files only on the screen that is currently on (that is, K<N), or may play video files on only a main screen (that is, K=1), and the user may select settings according to requirements. This is not specifically limited in this embodiment of the present disclosure.

In the video playback method provided in the embodiments of the present disclosure, first, the first terminal device including N screens obtains M video files and configuration information of the M video files. Then, the first terminal device plays K video files in the M video files on K screens in the N screens according to the configuration information. Because the configuration information may be used for indicating the screen identifier associated with each of the M video files, the first terminal device may determine a display position of each video file on the K screens based on the screen identifier in the configuration information, so that when the first terminal device plays the K video files in the K screens, a user does not need to manually search each video file, and the user does not need to re-search the video file and then click to play the video file each time during playback. For example, when the M video files are video files obtained through screen recording by a multi-screen terminal device, the first terminal device can directly play the K video files in the M video files on the K screens of the first terminal device according to the screen identifiers corresponding to the recording screens, and the user does not need to search another video file after one video file is played. Therefore, the video playback manner provided in this embodiment of the present disclosure is more flexible and convenient.

In a possible implementation, in the video playback method provided in the embodiments of the present disclosure, the foregoing step 202 may be specifically performed by using the following step 202a1 to step 202a3:

Step 202a1. The first terminal device separately displays one video card on each of the K screens according to the configuration information.

The video card displayed on each of the K screens is used for indicating one of the K video files, and a video file indicated by a video card displayed on one screen corresponds to a screen identifier of the one screen.

Optionally, the video card may be a first frame of image of a video, or a frame of image corresponding to a video that is paused, which is not specifically limited in this embodiment of the present disclosure.

Optionally, a playback control may be further displayed on the video card. This is not specifically limited in this embodiment of the present disclosure.

Step 202a2. The first terminal device receives a first input that is performed on a first target screen in the K screens by a user.

Optionally, the first target screen may be a main screen, a first screen (for example, a leftmost screen or a rightmost screen) or any screen being operated of the first terminal device, or certainly, may be a screen set by the user, which is not specifically limited in this embodiment of the present disclosure.

It should be noted that the first input is used for triggering the first terminal device to play the video file. The first input may be a sliding input of a preset gesture, or may be an input to a control, which is not specifically limited in this embodiment of the present disclosure.

Step 202a3. The first terminal device plays the K video files on the K screens in response to the first input.

Figure 5:
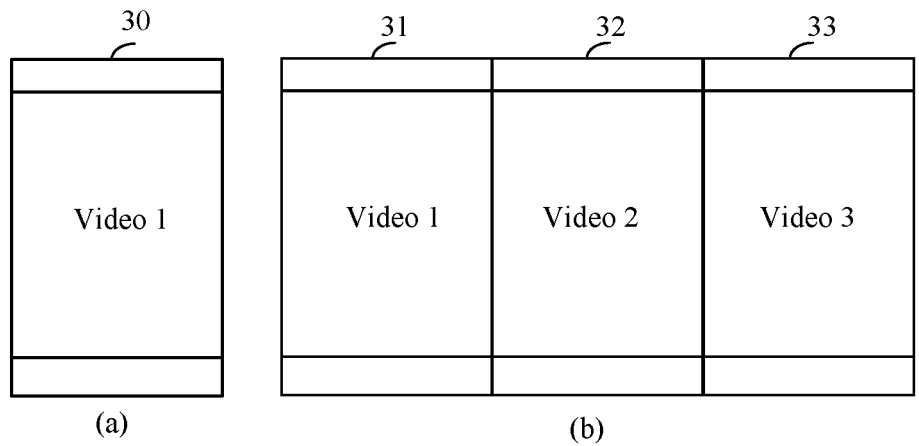
FIG. 5 is a first schematic diagram of a manner of arranging video cards according to an embodiment of the present disclosure.

Exemplarily, FIG. 5 is a schematic diagram of a manner of arranging video cards according to an embodiment of the present disclosure. When the first terminal device displays a video card on only one screen, as shown in (a) of FIG. 5, a video card of a video 1 is displayed on only a screen 30. When the first terminal device includes three screens and all the three screens display video cards, as shown in (b) of FIG. 5, a video card of a video 1 on a screen 31, a video card of a video 2 on a screen 32, and a video card of a video 3 on a screen 33 may be sequentially displayed according to a sequence from left to right.

Optionally, the foregoing video cards are arranged only according to a sequence from small to large of corresponding screen identifiers in the configuration information, or certainly, may be arranged in another form, for example, according to a sequence from small to large.

It should be noted that in the foregoing example, an example in which the screen identifier is a number is used. Certainly, in actual application, the screen identifier may alternatively be a letter, such as a screen A, a screen B, a screen C, or a screen D; or the screen identifier may be a combination of a number and a letter, which is not specifically limited in this embodiment of the present disclosure.

It can be understood that the foregoing "when the first terminal device displays a video card on only one screen" includes the following two cases. In a first case, the first terminal device is a terminal device including only one screen. In a second case, the first terminal device is a terminal device including a plurality of screens, displays the video cards on only one of the screens, and does not display the video cards on other screens.

Based on this solution, the first terminal device may first separately display one video card on each of the K screens according to the configuration information. Compared with displaying only one video file card each time, the first terminal device may display video cards corresponding to a plurality of video files, which makes it convenient for the user to preview and select video files to be played. If the user needs to watch the video files, the user may input the first input on the first target screen, to control the first terminal device to play the K video files on the K screens, so that the video files are played more flexibly and conveniently.

Optionally, a playback control is displayed on the first target screen. The first terminal device may receive the first input that is performed on the playback control by the user. After the first terminal device displays the K video files, the user may control the playback of the K video files through single clicking on the playback control displayed on the first target screen, which makes it convenient for the user to operate.

Optionally, after step 202a1, the video playback method provided in the embodiments of the present disclosure may further include step 202a4 and step 202a5:

Step 202a4. The first terminal device receives a second input by a user.

The second input is an input on a first screen, and the first screen is any one of the K screens.

Exemplarily, the second input may be a sliding input that is performed on the first screen by the user, such as sliding upward, sliding downward, sliding leftward, or sliding rightward. Certainly, the second input may alternatively be another input, such as clicking or pressing, which is not specifically limited in this embodiment of the present disclosure.

Specifically, the second input may alternatively be an input that is performed on the first screen by a user to a video card displayed on the first screen, which is not specifically limited in this embodiment of the present disclosure.

Step 202a5. The first terminal device updates, in response to the second input, a video card displayed on a second target screen.

The second target screen includes at least one of the K screens.

Optionally, the second target screen may or may not include the first screen. This is not specifically limited in this embodiment of the present disclosure.

Based on this solution, the first device may update, through the second input by the user, the video card displayed on the second target screen. Because the second target screen may include the at least one of the K screens, that is, only a video card displayed on one of the screens may be updated, or video cards displayed on a plurality of screens may be updated, the user may select how to update according to requirements.

Optionally, in the video playback method provided in the embodiments of the present disclosure, if the second target screen is the first screen, the foregoing step 202a5 may be performed in the following manner 1 or manner 2:

Manner 1: The first terminal device updates a first video card to a second video card in response to the second input.

The first video card is used for indicating a first video file, the second video card is used for indicating a second video file, and the second video file is a video file except the K video files in the M video files.

It should be noted that assuming that K=1, that is, the first terminal device displays a video card on only one screen, the first video card is the video card displayed on the first screen, and the second video file may be a video file except the first video file in the M video files. Assuming that K>1, that is, the second terminal device displays video cards on at least two screens, the first video card may be the video card displayed on the first screen; or may not be the video card displayed on the first screen. For example, the first video card may be a video card on a screen adjacent to the first screen, or may be a video card on a screen, close to an edge, of the first terminal device, which is not specifically limited in this embodiment of the present disclosure.

Figure 6:
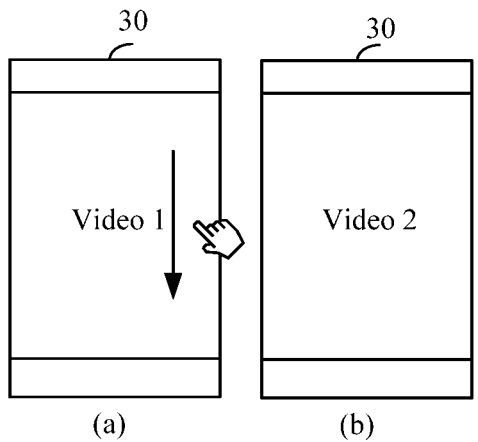
FIG. 6 is a second schematic diagram of a manner of arranging video cards according to an embodiment of the present disclosure.

Exemplarily, assuming that the second input is an input by a user to the first video card, the second video card is obtained by the first terminal device according to an input parameter of the second input. For example, the second input is a sliding input, the input parameter of the second input is a sliding distance, and a new video card may be obtained every 1 cm of sliding. It is assumed that the first terminal device displays the video cards according to the sequence from large to small of the screen identifiers. With reference to the screen 30 in FIG. 5, as shown in (a) of FIG. 6, if the user slides on the screen 30 downward by 1 cm, the first terminal device may display the video card of the video 2 on the screen 30 as shown in (b) of FIG. 6.

Based on this solution, when the second target screen is the first screen, after the first terminal device displays the video cards on the screens, if the user intends to replace a video file corresponding to one of the video cards with another video file, the user may input the second input on the first screen, to control the first terminal device to replace the first video card with the second video card. Therefore, the user may choose, according to requirements, to replace a video file that is not played temporarily, so that the user more flexibly controls the first terminal device to play the video file.

Manner 2: The first terminal device updates, in response to the second input, the first video card displayed on the first screen to a third video card.

The third video card is used for indicating a third video file, and the screen identifier of the first video file is adjacent to the screen identifier of the third video file.

It can be understood that the screen identifier of the third video file may be a previous screen identifier of the first video file, or may be a next screen identifier of the first video file, which is not specifically limited in this embodiment of the present disclosure.

For example, if the first video file is a video file 2, the third video file may be a video file 1 or a video file 3. The user may choose, according to requirements, a direction of increasing values of the screen identifiers or a direction of decreasing values of the screen identifiers the second input in which the second input is performed. For example, the video card of the video file 2 is updated to the video card of the video file 3 in an upward sliding manner, and the video card of the video file 2 is updated to the video card of the video file 1 in a downward sliding manner.

Optionally, the first terminal device may alternatively update the first video card displayed on the first screen to a video card with a maximum identifier of a corresponding video file in video cards except the foregoing K video cards or a video card adjacent to a screen identifier of a video card displayed on a screen with a maximum screen identifier in the K screens.

Figure 7:
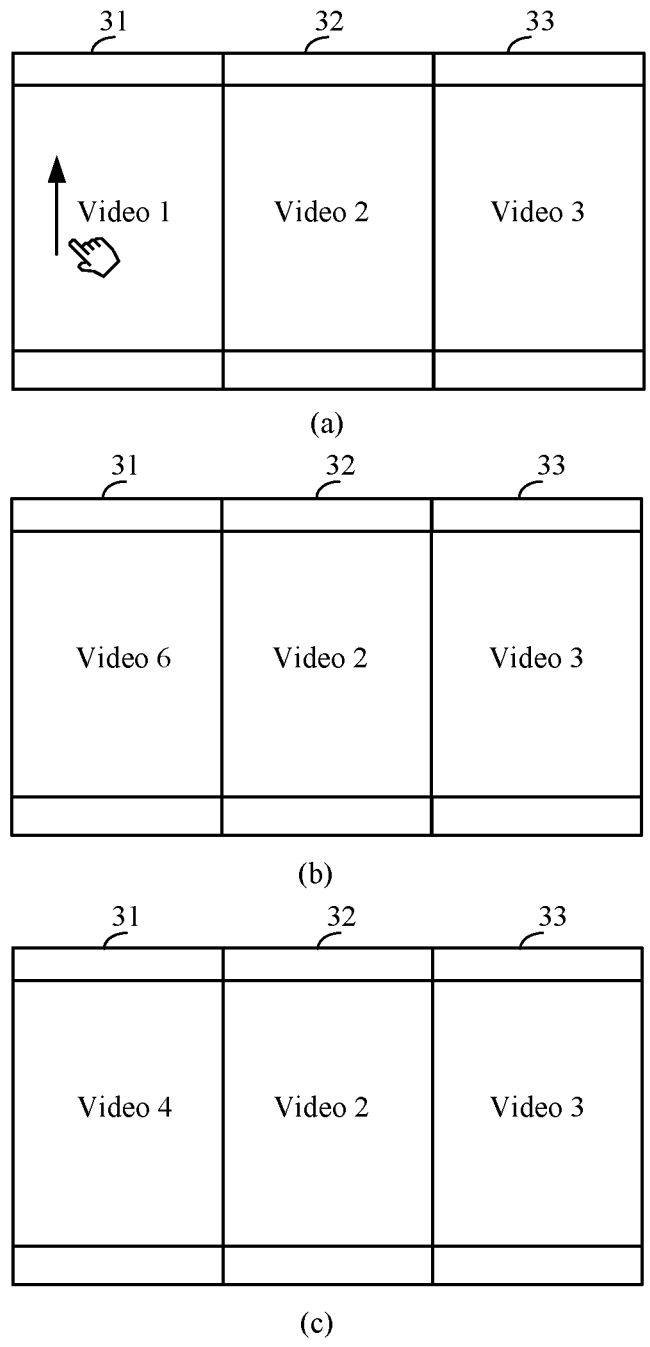
FIG. 7 is a third schematic diagram of a manner of arranging video cards according to an embodiment of the present disclosure.

Exemplarily, with reference to (b) of FIG. 5, as shown in (a) of FIG. 7, assuming that M=6, if the first terminal device updates a video card displayed on only one screen each time, and the user slides on the screen 31, as shown in (b) of FIG.

7, the first terminal device may update the video card of the video 1 displayed on the screen 31 to be displayed as a video card of a video 6. The video 6 is a video file with a maximum screen identifier except three video files: the video 1, the video 2, and the video 2. Certainly, as shown in (c) of FIG. 7, the first device may alternatively display a video card of a video 4 on the screen 31. The video 4 is adjacent to a screen identifier of the video 3 displayed on a screen 33 with a maximum screen identifier.

Based on this solution, if the second target screen is the first screen, after the first terminal device receives the second input, the first terminal device may update the first video card indicating the first video file to the third video card of the third video file adjacent to the screen identifier of the first video file, so that the manner of updating the video card displayed on the screen is more flexible.

Optionally, in the video playback method provided in the embodiments of the present disclosure, if the second target screen includes P screens, and P is an integer greater than or equal to 2, the foregoing step 202*a*5 may be further performed in the following manner 3 or manner 4:

Manner 3: The first terminal device updates, in response to the second input, a fourth video card displayed on one screen to a fifth video card for each of the P screens.

A screen identifier of a video file indicated by the fourth video card is adjacent to a screen identifier of a video file indicated by the fifth video card.

Alternatively, a screen identifier of a video file indicated by the fourth video card is separated from a screen identifier of a video file indicated by the fifth video card by P screen identifiers.

Optionally, the screen identifiers of the video files indicated by the K video cards on the foregoing K screens may or may not be adjacent. This is not specifically limited in this embodiment of the present disclosure.

It can be understood that when P=K, the first terminal device updates the K video cards displayed on the K screens each time.

It should be noted that in manner 3, the P screens may or may not include the second screen. This is not specifically limited in this embodiment of the present disclosure.

Figure 8:
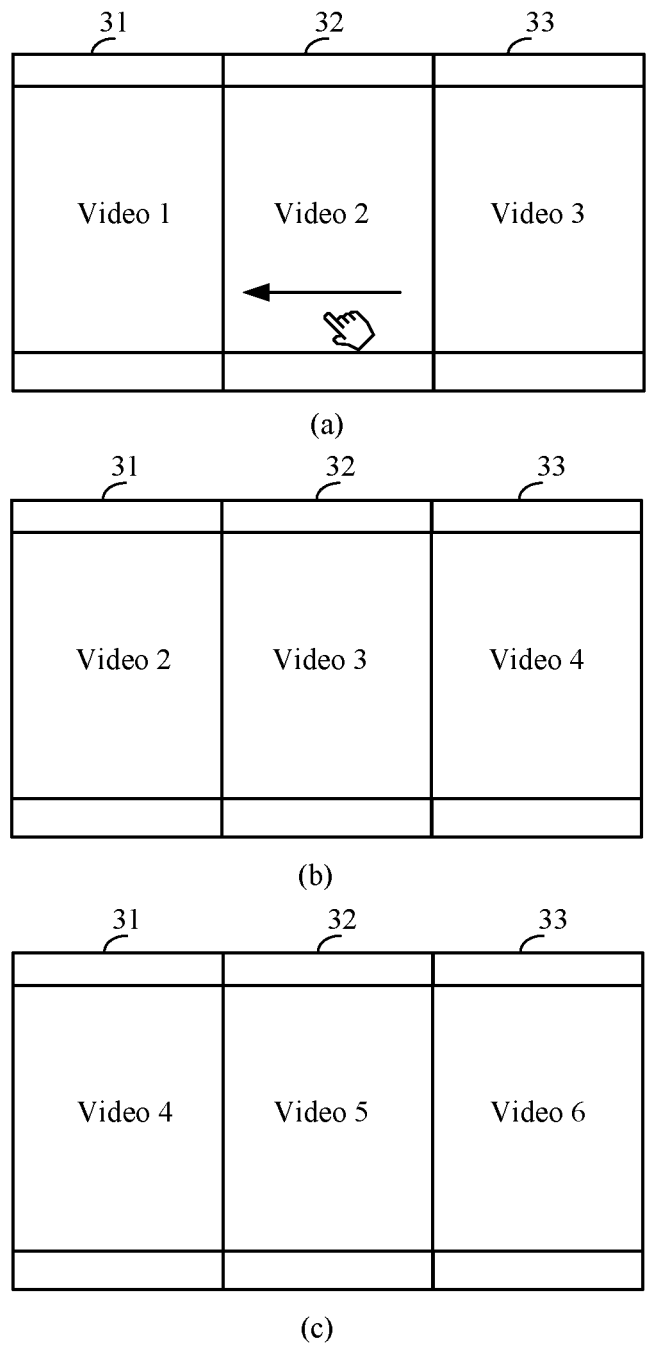
FIG. 8 is a fourth schematic diagram of a manner of arranging video cards according to an embodiment of the present disclosure.

Exemplarily, the second input is a sliding input on the first screen. Description is made by using an example in which the second input is used for updating the video cards on all of the K screens. With reference to (b) of FIG. 5, as shown in (a) of FIG. 8, assuming that the user slides on the screen 32 leftward, as shown in (b) of FIG. 8, the video card horizontally moves to the left on the screen visually as a whole. The first terminal device may update the video card of the video 1 displayed on the screen 31 to be displayed as the video card of the video 2, update the video card of the video 2 displayed on the screen 32 to be displayed as the video card of the video 3, and update the video card of the video 3 displayed on the screen 33 to be displayed as the video card of the video 4. Certainly, as shown in (c) in FIG. 8, the video card may also horizontally move to the right visually as a whole. The first terminal device may update the video card of the video 1 displayed on the screen 31 to be displayed as the video card of the video 4, update the video card of the video 2 displayed on the screen 32 to be displayed as a video card of a video 5, and update the video card of the video 3 displayed on the screen 33 to be displayed as a video card of a video 6.

Figure 9:
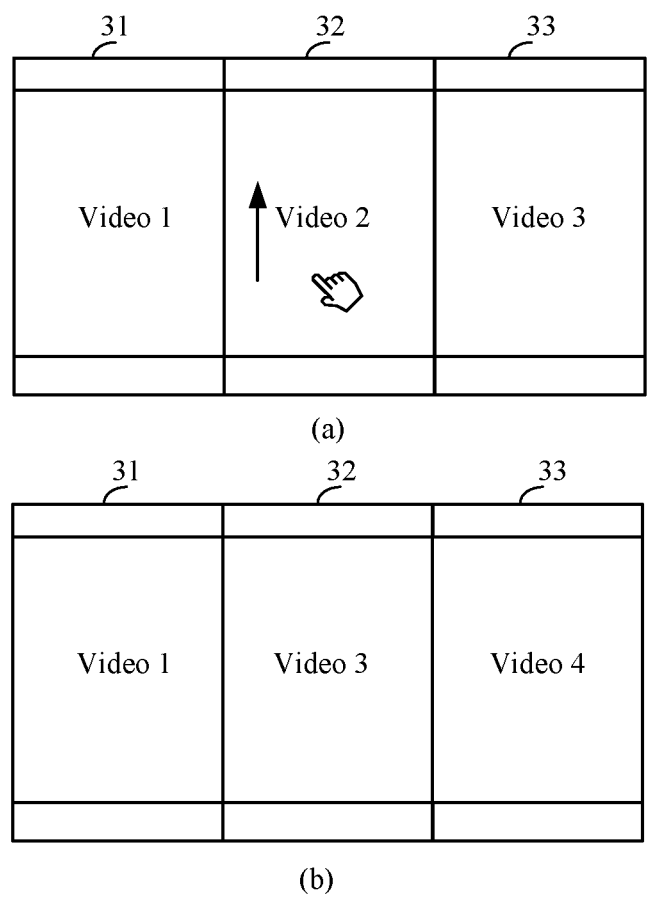
FIG. 9 is a fifth schematic diagram of a manner of arranging video cards according to an embodiment of the present disclosure.

In the foregoing example, description is made by using an example in which the P screens include the second screen. If the P screens do not include the second screen, as shown in (a) of FIG. 9, assuming that the second input is a sliding input that is performed on the screen 32 by the user, as shown in (b) of FIG. 9, the first terminal device updates the video card of the video file 2 displayed on the screen 32 to be displayed as the video card of the video file 3, and updates the video card of the video file 3 displayed on the screen 33 to be displayed as the video card of the video file 4.

Exemplarily, when P≥2, and the P screen identifiers are consecutive numbers, a minimum identifier in the P screen identifiers is greater than a second screen identifier. In this case, the first terminal device may update only video cards on screens with that greater than the second screen identifier. The P screen identifiers are consecutive letters, and a screen identifier in the P screen identifiers at a position closest to a letter Z in an alphabet is closer to the letter Z than the second screen identifier at a position in the alphabet.

It should be noted that in the foregoing example, description is made by using an example in which the second input updates the video card only on the right of the screen in which the second input is located. Certainly, the second input may alternatively update a video card on the left of the screen in which the second input is located.

Based on this solution, if the second target screen includes P screens, after the first terminal device receives the second input by the user, the first terminal device may update a fourth video card displayed on one screen to a fifth video card adjacent to the screen identifier of the video file indicated by the fourth video card or separated by the P screen identifiers, so that the manner of updating the video card is more diverse.

Manner 4: The first terminal device updates, in response to the second input, video cards displayed on the P screens.

Optionally, in manner 4, the updated P video cards on the P screens may be used for indicating P video files with maximum screen identifiers or P video files with minimum screen identifiers in target video files.

The target video files are video files except the K video files in the M video files.

It should be noted that when the screen identifier is represented by a number, a larger screen identifier indicates that a screen identifier value is further away from a value 1, and a smaller screen identifier indicates that a screen identifier value is closer to the value 1; when the screen identifier is represented by a letter, the larger screen identifier indicates that a screen identifier value is closer to the letter Z, and the smaller screen identifier indicates a screen identifier value is closer to a letter A. Certainly, the screen identifier may alternatively be represented by another symbol. Details are not described herein again.

Based on this solution, if the second target screen includes the P screens, the first terminal device may update, according to the second input, the video cards displayed on the P screens to the video cards of the P video files with maximum screen identifiers or the video cards of the P video files with minimum screen identifiers in the target video files, so that the manner of updating the video cards is more diverse, and it is convenient for the user to replace a plurality of video cards according to use habits or according to user requirements.

Optionally, in manner 4, the updated P video cards on the P screens may be further used for indicating P video files with the minimum number of display times or P video files with the maximum number of display times in target video files.

It should be noted that the number of display times may be the number of times displayed on the screens in a process of currently triggering the first terminal device to play the M video files; or may be the number of times displayed in a historical playback record of the M video files, which is not limited in this embodiment of the present disclosure.

Optionally, the foregoing number of display times may alternatively be the number of played times, which is not specifically limited in this embodiment of the present disclosure.

Based on this solution, if the second target screen includes P screens, the first terminal device may update, according to the second input, video cards displayed on the P screens to the video cards of the P video files with the minimum number of display times or video cards of the P video files with the maximum number of display times in the target video files, so that the manner of updating the video cards is more diverse, and it is convenient for the user to replace a plurality of video cards according to use habits of the user or according to user requirements.

It should be noted that the manners of the second input corresponding to the foregoing different update manners are different. The first terminal device may update, in different arrangement manners according to different inputs by a user, an arrangement displaying the video cards, so that the diversity of displaying the updated video cards on the terminal device can be improved. When the first terminal device displays the video cards on more than two (that is, K is an integer greater than or equal to 2) screens, the first terminal device may update, according to the second input that is performed on the first of the K screens by the user, the video card displayed on each of the P screens in the K screens, so that it is convenient for the user to replace the plurality of videos according to requirements.

In a possible implementation, after step 202a1, the video playback method provided in the embodiments of the present disclosure further includes 202a6 and step 202a7:

Step 202a6. The first terminal device receives a third input by a user.

The third input is an input on a third screen, and the third screen is any one of the K screens.

It can be understood that if the screen identifier uses a letter, a trajectory of the fourth input may alternatively be a stroke of a target letter. If the screen identifier uses a number, the trajectory of the fourth input may alternatively be a stroke of a target number. This is not specifically limited in this embodiment of the present disclosure.

Step 202a7. The first terminal device updates, in response to the third input, a video card displayed on the third screen to a sixth video card associated with a trajectory of the third input.

The sixth video card is used for indicating a sixth video file, and the trajectory of the third input is associated with a screen identifier of the sixth video file.

Figure 10:
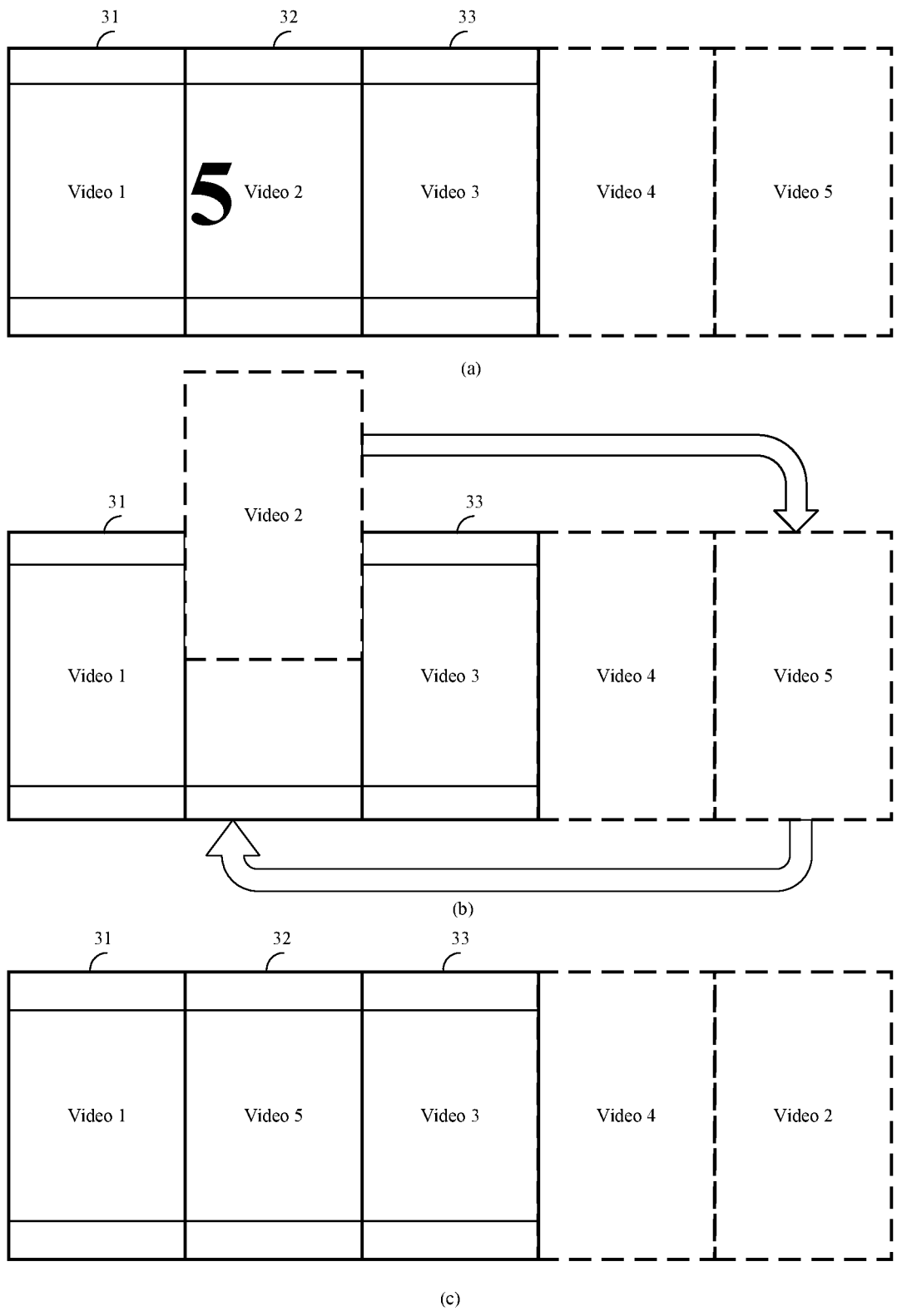
FIG. 10 is a sixth schematic diagram of a manner of arranging video cards according to an embodiment of the present disclosure.

Exemplarily, with reference to (b) of FIG. 5, as shown in (a) of FIG. 10, assuming that the video files are sequentially displayed on the screen 31, the screen 32, and the screen 33 according to the sequence of the screen identifiers from small to large, in a current present state, the video 4 and the video 5 are videos in a queue of to-be-displayed videos. If the user draws a number 5 on the screen 32, the first terminal device may replace the video card of the video 2 on the screen 32 with the video card of the video 5 with the screen identifier 5 according to the process shown in (b) of FIG. 10, a result shown in (c) of FIG. 10 is displayed on the screen 32, and the video 2 may be arranged at a position at which the video 5 is originally located in the queue of to-be-displayed videos.

It should be noted that if the sixth video file is a video file except the video files displayed on the third screen in the K video files, a display position of the video card displayed on the screen is adjusted.

Exemplarily, the third input may include a plurality of sub-inputs. For example, the user may draw a number on a screen and then slide upward, to determine to update the video card. For example, in (b) of FIG. 10, if the user draws the number 5 on the screen 32 and then slides upward, the first terminal device then updates the video card of the video 2 to the video card of the video 5.

Based on this solution, the first terminal device may update, according to the trajectory of the third input on the screen, the video card displayed on the third screen to the sixth video card associated with the trajectory of the third input. For example, if the user may slide a stroke of a number on any one of the K screens, the terminal device may display a video card corresponding to the stroke on the screen according to the stroke, so that it is more convenient for the user to adjust, according to requirements, the sequence of displaying the video cards.

Optionally, the first input includes at least two sub-inputs.

In a possible implementation, in the video playback method provided in the embodiments of the present disclosure, the foregoing step 202 may be further performed by using step 202b:

Step 202b. The first terminal device sequentially plays the K video files on the K screens in response to the at least two sub-inputs according to playback parameters corresponding to the at least two sub-inputs.

The playback parameters include at least one of the following: a playback sequence, playback duration, a playback start position, and a playback end position.

Exemplarily, assuming that the user needs to set the playback sequence, the user may set a sequence of playing videos by sliding preset trajectories on screens. For example, one terminal device includes three screens, and the preset trajectories are the screen 1 displayed on the screen 1 through upward sliding, the video displayed on the screen 2 through transverse sliding, and the video displayed on the screen 3 through downward sliding respectively. If the user first slides upward, next slides downward, and then slides transversely (either to the left or to the right) on the main screen, the videos displayed on the screen 1, the screen 3, and the screen 2 may be played sequentially.

Exemplarily, it is assumed that the user needs to set the playback sequence and the playback duration. For example, one terminal device includes three screens, the preset trajectories are the video displayed on the screen 1 through upward sliding, the video displayed on the screen 2 through transverse sliding, and the video displayed on the screen 3 through downward sliding respectively. After setting the playback sequence of one screen, the user may further continuously slide a number stroke on the screen. The number stroke represents playback duration of the video on the screen. For example, if the user first slides upward, next slides a trajectory of a number 5, then slides downward, next slides a trajectory of a number 10, finally slides transversely (either to the left or to the right), and then slides a trajectory of a number 15 on the main screen, the video on the screen 1 for 5 minutes, the video on screen 3 for 10 minutes, and the video displayed on the screen 2 for 15 minutes may be played sequentially.

Exemplarily, the user may further slide on the main screen upward to invoke the video on the screen 1 on the main screen, then drag a progress bar to set a playback start position and a playback end position, then slide on the main screen downward to invoke the video on the screen 3 on the main screen, then set a playback start position and a playback end position, then slide transversely on the main screen to invoke the video on the screen 2 on the main screen, then set a playback start position and a playback end position, and finally trigger, through the playback control on the main screen or a quick operation (for example a long press), the terminal device to separately play the videos according to the start position and the end position corresponding to each screen according to a sequence of the screen 1, the screen 3, and the screen 2.

Based on this solution, the terminal device may set the playback parameters corresponding to the at least two sub-inputs according to the at least two sub-inputs of the user, so that the user can flexibly control the playback sequence, duration, start position, and end position of the video file according to requirements.

Optionally, before step 201, the video playback method provided in the embodiments of the present disclosure may further include step 203 and step 204:

Step 203. The first terminal device receives a fourth input by a user.

The fourth input is an input on a fourth screen, the fourth screen is any one of the N screens, and the fourth input is used for triggering the first terminal device to perform screen recording.

Optionally, the fourth screen may be a main screen of the first terminal device, or may be any another screen-on screen, which is not specifically limited in this embodiment of the present disclosure.

Step 204. The first terminal device records M screens in the N screens in response to the fourth input.

Specifically, step 204 may be performed by using step 204a:

Step 204a. The first terminal device determines the M screens from the N screens, and records the M screens in response to the fourth input.

Optionally, the first terminal device may determine M screens that display dynamic pictures from the N screens, and record the M screens, or the first terminal device may record the M screens according to the M screens correspondingly selected by the fourth input. This is not specifically limited in this embodiment of the present disclosure.

Based on this solution, the user may trigger to record a plurality of screens on any screen of the first terminal device. After the first terminal device receives the fourth input, the first terminal device may determine M screens from the N screens of the first terminal device, and then record the M screens.

Optionally, after step 204, the video playback method provided in the embodiments of the present disclosure may further include step 205:

Step 205. The first terminal device generates configuration information according to target information obtained by recording the M screens.

The target information includes screen identifiers of the M screens, and the M video files obtained by recording the M screens.

It should be noted that the first terminal device may alternatively generate configuration information according to target information obtained by recording video files on different screens non-simultaneously, so that the first terminal device may play the video files on different screens in the foregoing playback manner. This is not specifically limited in this embodiment of the present disclosure.

Based on this solution, after the first terminal device records the M screens, the first terminal device may generate the configuration information according to the target information obtained by recording the M screens, to facilitate in playing the M video files according to the configuration information corresponding to the M video files when the user subsequently intends to play the M video files.

Optionally, before step 201, the video playback method provided in the embodiments of the present disclosure may further include step 206 and step 207:

Step 206. The first terminal device receives the M video files and the configuration information that are sent by a second terminal device.

Exemplarily, the second terminal device may send a multi-screen recording file including the M video files and the configuration information. After receiving the multi-screen recording file, the first terminal device may obtain the video files and the configuration information according to the multi-screen recording file.

Step 207. The first terminal device stores the M video files and the configuration information in the first terminal device.

It can be understood that if receiving one multi-screen recording file, the first terminal device may also store the multi-screen recording file.

Based on this solution, the first terminal device may store the M video files and the configuration information received from the second terminal device. When the user needs to play the M video files, the user may trigger the first terminal device to play the M video files according to the configuration information stored in the first terminal device.

Optionally, before step 201, the video playback method provided in the embodiments of the present disclosure further includes step 208 to step 210:

Step 208. The first terminal device obtains a historical record that the first terminal device plays the M video files.

The historical record includes screen identifiers of the M video files.

Exemplarily, the screen identifiers of the M video files indicate a screen identifier of a screen on which a video file is played.

It can be understood that the first terminal device may determine, according to the historical record, a screen on which the M video files are played historically, to obtain the screen identifiers of the M video files. Certainly, the first terminal device may also set a screen identifier of each video file according to a historical playback sequence. This is not specifically limited in this embodiment of the present disclosure.

Step 209. The first terminal device determines configuration information of the M video files according to the historical record.

Step 210. The first terminal device stores the M video files and the configuration information in the first terminal device.

Based on this solution, the first terminal device may obtain, according to the played historical record, the screen identifiers of the M video files, so as to determine configuration information of the M video files, and the first terminal device stores the M video files and the configuration information in the first terminal device, so that the user can conveniently play the M video files according to the configuration information when playing the video files later.

Figure 11:
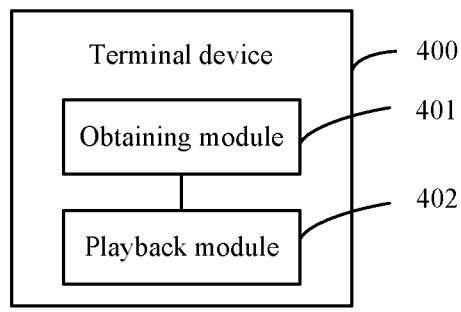
FIG. 11 is a first possible schematic structural diagram of a terminal device according to an embodiment of the present disclosure.

FIG. 11 is a possible schematic structural diagram of a terminal device according to an embodiment of the present disclosure. The terminal device includes N screens. As shown in FIG. 11, the terminal device 400 includes an obtaining module 401 and a playback module 402. The obtaining module 401 is configured to obtain M video files and configuration information of the M video files, where the configuration information is used for indicating a screen identifier associated with each of the M video files. The playback module 402 is configured to play K video files in the M video files on K screens in the N screens according to the configuration information obtained by the obtaining module 401, where both N and K are positive integers, and M is an integer greater than or equal to 2.

Optionally, the playback module 402 is specifically configured to: separately display one video card on each of the K screens according to the configuration information obtained by the obtaining module 401, where the video card displayed on each screen is used for indicating one of the K video files, and a video file indicated by a video card displayed on one screen corresponds to a screen identifier of the one screen; and receive a first input that is performed on a first target screen in the K screens by a user, and play the K video files on the K screens in response to the first input.

Optionally, a playback control is displayed on the target screen. The playback module 402 is specifically configured to: receive the first input by the user to the playback control.

Figure 12:
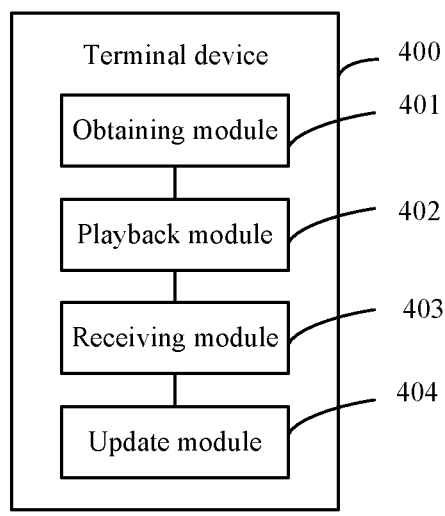
FIG. 12 is a second possible schematic structural diagram of a terminal device according to an embodiment of the present disclosure.

Optionally, with reference to FIG. 11, as shown in FIG. 12, the terminal device 400 further includes a receiving module 403 and an update module 404. The receiving module 403 is configured to: receive a second input by a user after the playback module 402 separately displays one video card on each of the K screens according to the configuration information, where the second input is an input on a first screen, and the first screen is any one of the K screens. The update module 404 is configured to update, in response to the second input received by the receiving module 403, a video card displayed on a second target screen, where the second target screen includes at least one of the K screens.

Optionally, the second target screen is the first target screen. The update module 404 is specifically configured to update a first video card displayed on the first screen to a second video card, where the first video card is used for indicating a first video file, the second video card is used for indicating a second video file, and the second video file is a video file except the K video files in the M video files.

Optionally, the update module 404 is specifically configured to update the first video card displayed on the first screen to a third video card, where the third video card is used for indicating a third video file, and a screen identifier of the first video file is adjacent to a screen identifier of the third video file.

Optionally, the second target screen includes P screens, and P is an integer greater than or equal to 2. The update module 404 is specifically configured to update a fourth video card displayed on one screen to a fifth video card for each of the P screens, where a screen identifier of a video file indicated by the fourth video card is adjacent to a screen identifier of a video file indicated by the fifth video card, or a screen identifier of a video file indicated by the fourth video card is separated from a screen identifier of a video file indicated by the fifth video card by P screen identifiers.

Optionally, the second target screen includes P screens, and P is an integer greater than or equal to 2. The update module 404 is specifically configured to update video cards displayed on the P screens, where the updated P video cards on the P screens are used for indicating P video files with maximum screen identifiers or P video files with minimum screen identifiers in target video files, and the target video files are video files except the K video files in the M video files.

Optionally, the second target screen includes P screens, and P is an integer greater than or equal to 2. The update module 404 is specifically configured to update video cards displayed on the P screens, where the updated P video cards on the P screens are used for indicating P video files with the minimum number of display times or P video files with the maximum number of display times in target video files, and the target video files are video files except the K video files in the M video files.

Optionally, with reference to FIG. 11, as shown in FIG. 12, the terminal device 400 further includes a receiving module 403 and an update module 404. The receiving module 403 is configured to receive a third input by a user after the playback module 402 separately displays one video card on each of the K screens according to the configuration information, where the third input is an input on a third screen, and the third screen is any one of the K screens. The update module 404 is further configured to update, in response to the third input received by the receiving module 403, a video card displayed on the third screen to a sixth video card associated with a trajectory of the third input, where the sixth video card is used for indicating a sixth video file, and the trajectory of the third input is associated with a screen identifier of the sixth video file.

Optionally, the first input includes at least two sub-inputs. The playback module 402 is specifically configured to sequentially play the K video files on the K screens in response to the at least two sub-inputs according to playback parameters corresponding to the at least two sub-inputs, where the playback parameters include at least one of the following: a playback sequence, playback duration, a playback start position, and a playback end position.

Figure 13:
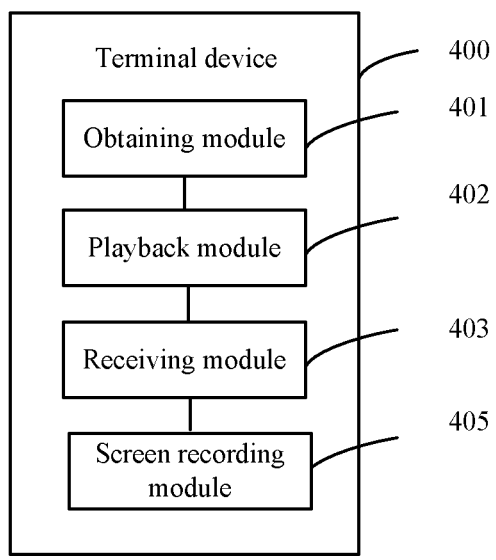
FIG. 13 is a third possible schematic structural diagram of a terminal device according to an embodiment of the present disclosure.

Optionally, with reference to FIG. 11, as shown in FIG. 13, the terminal device 400 further includes a receiving module 403 and a screen recording module 405. The receiving module 403 is configured to receive a fourth input by a user before the obtaining module 401 obtains M video files and configuration information of the M video files, where the fourth input is an input on a fourth screen, the fourth screen is any one of the N screens, and the fourth input is used for triggering the terminal device 400 to perform screen recording. The screen recording module 405 is configured to record M screens in the N screens in response to the fourth input received by the receiving module 403, where M is less than or equal to N.

Optionally, the screen recording module 405 is specifically configured to determine the M screens from the N screens, and record the M screens in response to the fourth input received by the receiving module 403.

Figure 14:
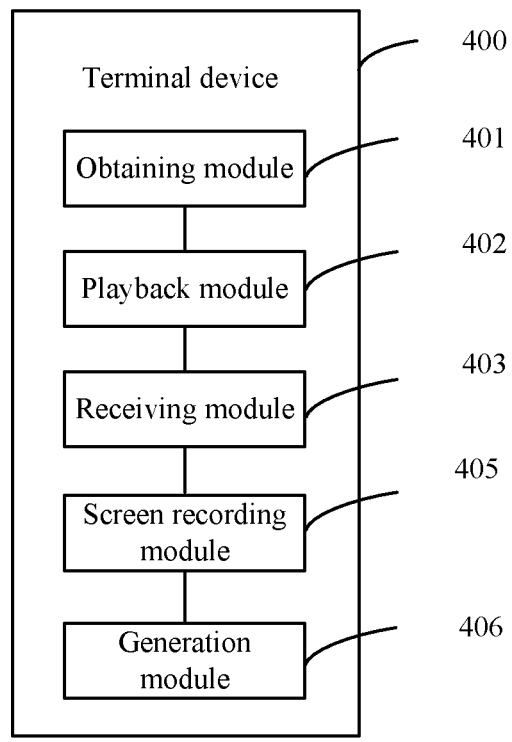
FIG. 14 is a fourth possible schematic structural diagram of a terminal device according to an embodiment of the present disclosure.

Optionally, with reference to FIG. 13, as shown in FIG. 14, the terminal device 400 further includes a generation module 406. The generation module 406 is configured to generate, after the screen recording module 405 records the M screens, configuration information according to target information obtained by recording the M screens, where the target information includes screen identifiers of the M screens, and the M video files obtained by recording the M screens.

Figure 15:
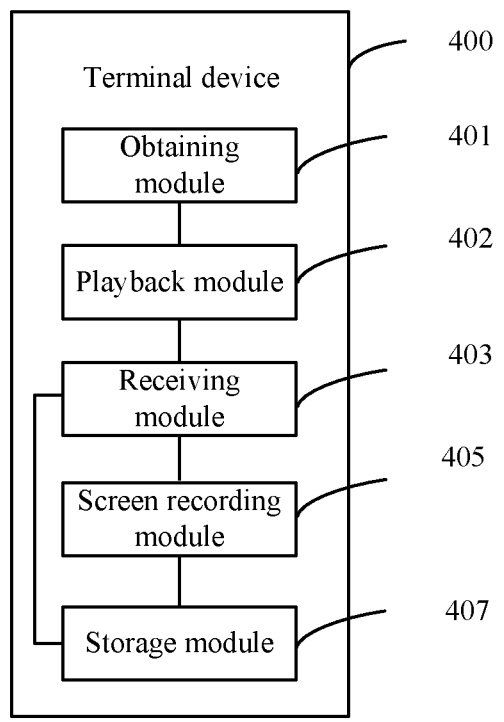
FIG. 15 is a fifth possible schematic structural diagram of a terminal device according to an embodiment of the present disclosure.

Optionally, with reference to FIG. 12, as shown in FIG. 15, the terminal device 400 further includes a storage module 407. The receiving module 403 is further configured to receive, before the obtaining module 401 obtains M video files and configuration information of the M video files, the M video files and the configuration information that are sent by a second terminal device. The storage module 407 is configured to store the M video files and the configuration information in the terminal device 400.

Figure 16:
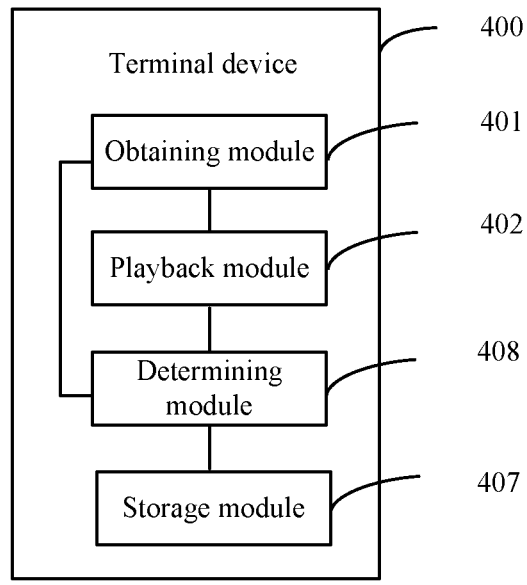
FIG. 16 is a sixth possible schematic structural diagram of a terminal device according to an embodiment of the present disclosure.

Optionally, with reference to FIG. 10, as shown in FIG. 16, the terminal device 400 further includes a determining module 408 and a storage module 407. The obtaining module 401 is further configured to obtain, before obtaining M video files and configuration information of the M video files, a historical record that the terminal device 400 plays the M video files, where the historical record includes a screen identifier of playing the M video files. The determining module 408 is configured to determine the configuration information of the M video files according to the historical record obtained by the obtaining module 401. The storage module 407 is configured to store the M video files and the configuration information in the terminal device 400.

The terminal device 400 provided in this embodiment of the present disclosure can implement processes implemented by the terminal device in the foregoing method embodiments. To avoid repetition, details are not described herein again.

In the terminal device provided in this embodiment of the present disclosure, first, the first terminal device including N screens obtains M video files and configuration information of the M video files. Then, the first terminal device plays K video files in the M video files on K screens in the N screens according to the configuration information. Because the configuration information may be used for indicating the screen identifier associated with each of the M video files, the first terminal device may determine a display position of each video file on the K screens based on the screen identifier in the configuration information, so that when the first terminal device plays the K video files in the K screens, a user does not need to manually search each video file, and the user does not need to re-search the video file and then click to play the video file each time during playback. For example, when the M video files are video files obtained through screen recording by a multi-screen terminal device, the first terminal device can directly play the K video files in the M video files on the K screens of the first terminal device according to the screen identifiers corresponding to the recording screens, and the user does not need to search another video file after one video file is played. Therefore, the video playback manner provided in this embodiment of the present disclosure is more flexible and convenient.

Figure 17:
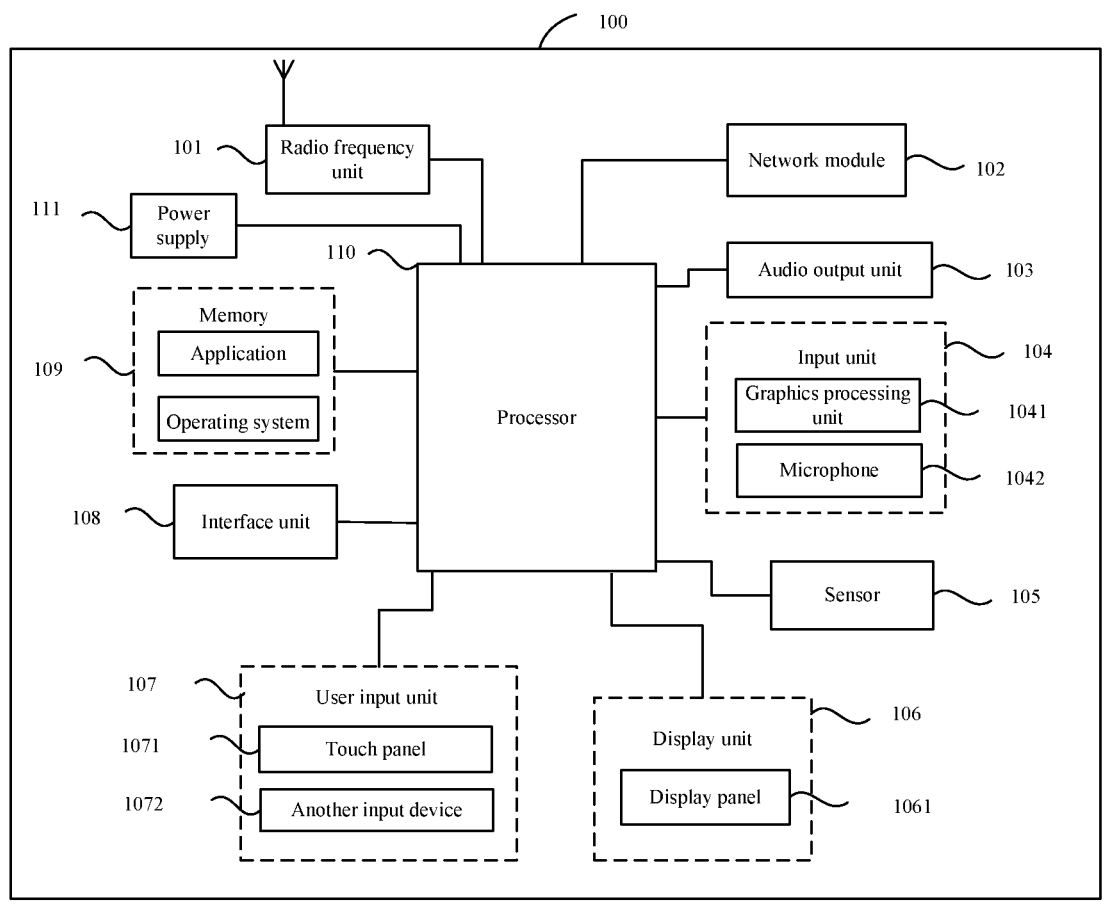
FIG. 17 is a schematic diagram of a hardware structure of a terminal device according to various embodiments of the present disclosure.

FIG. 17 is a schematic diagram of a hardware structure of a terminal device implementing the embodiments of the present disclosure. The terminal device 100 includes, but not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components. A person skilled in the art may understand that the structure of the terminal device shown in FIG. 17 does not constitute a limitation to the terminal device. The terminal device may include more or fewer components than that shown in the figure, or some components may be combined, or a different component arrangement may be used. In this embodiment of the present disclosure, the terminal device includes, but not limited to, a mobile phone, a tablet computer, a notebook computer, a palmtop computer, a vehicle-mounted terminal, a wearable device, a pedometer, or the like.

The processor 110 is configured to obtain M video files and configuration information of the M video files, where the configuration information is used for indicating a screen identifier of each of the M video files; and play K video files in the M video files on K screens in the N screens according to the configuration information, where both N and K are positive integers, and M is an integer greater than or equal to 2.

In the terminal device provided in this embodiment of the present disclosure, first, the first terminal device including N screens obtains M video files and configuration information of the M video files. Then, the first terminal device plays K video files in the M video files on K screens in the N screens according to the configuration information. Because the configuration information may be used for indicating the screen identifier associated with each of the M video files, the first terminal device may determine a display position of each video file on the K screens based on the screen identifier in the configuration information, so that when the first terminal device plays the K video files in the K screens, a user does not need to manually search each video file, and the user does not need to re-search the video file and then click to play the video file each time during playback. For example, when the M video files are video files obtained through screen recording by a multi-screen terminal device, the first terminal device can directly play the K video files in the M video files on the K screens of the first terminal device according to the screen identifiers corresponding to the recording screens, and the user does not need to search another video file after one video file is played. Therefore, the video playback manner provided in this embodiment of the present disclosure is more flexible and convenient.

It should be understood that in this embodiment of the present disclosure, the radio frequency unit 101 may be configured to receive and send information, or receive and send signals during a call. Specifically, after receiving downlink data from a base station, the radio frequency unit sends the downlink data to the processor 110 for processing. In addition, the radio frequency unit sends uplink data to the base station. Generally, the radio frequency unit 101 includes, but not limited to, an antenna, at least one amplifier, a transceiver, a coupler, a low noise amplifier, and a duplexer, and the like. In addition, the radio frequency unit 101 may further communicate with another device by using a wireless communications system and network.

The terminal device provides a user with wireless broadband Internet access through the network module 102, for example, helps the user receive and send emails, browse web pages, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a receiver, and the like.

The input unit 104 is configured to receive audio or video signals. The input unit 104 may include a Graphics Processing Unit (GPU) 1041 and a microphone 1042. The graphics processing unit 1041 processes image data of a static picture or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive sound and may process such sound into audio data. The processed audio data may be converted, in a call mode, into a format that may be sent to a mobile communication base station by using the radio frequency unit 101 for output.

The terminal device 100 further includes at least one sensor 105, such as an optical sensor, a motion sensor, and other sensors. Specifically, the optical sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 approaches an ear. As a type of the motion sensor, an accelerometer sensor may detect an acceleration in each direction (generally, three axes), and detect a value and a direction of gravity when the accelerometer sensor is static, and may be used to recognize a terminal device posture (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, and an infrared sensor. Details are not described herein.

The display unit 106 is configured to display information inputted by a user or information provided to a user. The display unit 106 may include the display panel 1061, and the display panel 1061 may be configured in a form of a Liquid Crystal Display (LCD), an Organic Light-Emitting Diode (OLED), or the like.

The user input unit 107 may be configured to receive inputted digit or character information, and generate key signal input related to user setting and function control of the terminal device. Specifically, the user input unit 107 includes a touch panel 1071 and another input device 1072. The touch panel 1071, also referred to as a touchscreen, may collect a touch operation performed by the user on or near the touch panel 1071 (for example, an operation performed by the user on or near the touch panel 1071 by using any proper object or accessory such as a finger or a stylus). The touch panel 1071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 110, and receives and executes a command sent by the processor 110. In addition, the touch panel 1071 may be implemented by using a plurality of types such as a resistive type, a capacitive type, an infrared ray, and a surface acoustic wave. In addition to the touch panel 1071, the user input unit 107 may also include another input device 1072. Specifically, the another input device 1072 may include, but not limited to, a physical keyboard, a function key (for example, a volume control key or a switch key), a trackball, a mouse, and a joystick. Details are not described herein again.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 17, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive an input (for example, data information or power) from an external apparatus and transmit the received input to one or more elements in the terminal device 100, or may be configured to transmit data between the terminal device 100 and the external apparatus.

The memory 109 may be configured to store a software program and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, or may include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, an application processor and a modem processor may be integrated into the processor 110. The application processor mainly processes an operating system, a user interface, an application, and the like. The modem processor mainly processes wireless communication. It can be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, an embodiment of the present disclosure further provides a terminal device, with reference to FIG. 17, including a processor 110, a memory 109, and a computer program stored in the memory 109 and runnable on the processor 110, and the computer program, when executed by the processor 110, implements processes of the foregoing embodiments of the video playback method, and a same technical effect can be achieved. To avoid repetition, details are not described herein again.

An embodiment of the present disclosure further provides a computer-readable storage medium. The computer-readable storage medium stores a computer program, and the computer program, when executed by a processor, implements the processes of the foregoing embodiments of the video playback method, and a same technical effect can be achieved. To avoid repetition, details are not described herein again. The computer-readable storage medium is, for example, a read-only memory (ROM), a random access memory (RAM), a magnetic disk, or an optical disc.

It should be noted that in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. Without more restrictions, the element defined by a phrase "include one . . . " does not exclude another same element in the process, method, article, or apparatus that includes the element.

According to the foregoing descriptions of the implementations, a person skilled in the art may clearly understand that the method in the foregoing embodiments may be implemented by using software and a required universal hardware platform, or certainly, may be implemented by using hardware. However, in many cases, the former is an exemplary implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of limitative. Inspired by the present disclosure, a person of ordinary skill in the art may make many forms without departing from the objective of the present disclosure and the protection scope of the claims, all of which fall within the protection of the present disclosure.

The invention claimed is:

1. A video playback method, performed by a first multi-screen terminal device comprising N screens, wherein the video playback method comprises:
    obtaining M video files and configuration information of the M video files, wherein the M video files are generated by the first multi-screen terminal device through screen-recording M screens among the N screens, and the configuration information of the M video files comprises a correspondence relationship between each of the M video files and a screen identifier identifying a corresponding physical screen among the M screens of the first multi-screen terminal device that is recorded to generate the video file; and
    playing K video files in the M video files on K screens among the N screens according to the configuration information of the M video files, wherein
    both N and K are positive integers, and M is an integer greater than or equal to 2, wherein the N screens, the M screens, and the K screens are all individual physical screens of the first multi-screen terminal device.

2. The video playback method according to claim 1, wherein the playing K video files in the M video files on K screens in the N screens according to the configuration information comprises:
    separately displaying one video card on each of the K screens according to the configuration information, wherein the video card displayed on each screen is used for indicating one of the K video files, and a video file indicated by a video card displayed on one screen corresponds to a screen identifier of the one screen; and
    receiving a first input that is performed on a first target screen in the K screens by a user, and playing the K video files on the K screens in response to the first input.

3. The video playback method according to claim 2, wherein after the separately displaying one video card on each of the K screens according to the configuration information, the video playback method further comprises:
    receiving a second input by a user, wherein the second input is an input on a first screen, and the first screen is any one of the K screens; and
    updating, in response to the second input, a video card displayed on a second target screen, wherein the second target screen comprises at least one of the K screens.

4. The video playback method according to claim 3, wherein the second target screen is the first screen, and the updating a video card displayed on a second target screen comprises:
    updating a first video card displayed on the first screen to a second video card, wherein
    the first video card is used for indicating a first video file, the second video card is used for indicating a second video file, and the second video file is a video file except the K video files in the M video files.

5. The video playback method according to claim 4, wherein the updating a first video card displayed on the first screen to a second video card comprises:
    updating the first video card displayed on the first screen to a third video card, wherein
    the third video card is used for indicating a third video file, and a screen identifier of the first video file is adjacent to a screen identifier of the third video file.

6. The video playback method according to claim 3, wherein the second target screen comprises P screens, and P is an integer greater than or equal to 2; and the updating a video card displayed on a second target screen comprises:
    updating a fourth video card displayed on one screen to a fifth video card for each screen in the P screens, wherein
    a screen identifier of a video file indicated by the fourth video card is adjacent to a screen identifier of a video file indicated by the fifth video card, or a screen identifier of a video file indicated by the fourth video card is separated from a screen identifier of a video file indicated by the fifth video card by P screen identifiers.

7. The video playback method according to claim 3, wherein the second target screen comprises P screens, and P is an integer greater than or equal to 2; and the updating a video card displayed on a second target screen comprises:
    updating video cards displayed on the P screens, wherein the updated P video cards on the P screens are used for indicating P video files with maximum screen identifiers or P video files with minimum screen identifiers in target video files, and the target video files are video files except the K video files in the M video files.

8. The video playback method according to claim 3, wherein the second target screen comprises P screens, and P is an integer greater than or equal to 2; and the updating a video card displayed on a second target screen comprises:
    updating video cards displayed on the P screens, wherein the updated P video cards on the P screens are used for indicating P video files with the minimum number of display times or P video files with the maximum number of display times in target video files, and the target video files are video files except the K video files in the M video files.

9. The video playback method according to claim 2, wherein after the separately displaying one video card on each of the K screens according to the configuration information, the video playback method further comprises:

receiving a third input by a user, wherein the third input is an input on a third screen, and the third screen is any one of the K screens; and updating, in response to the third input, a video card displayed on the third screen to a sixth video card associated with a trajectory of the third input, wherein the sixth video card is used for indicating a sixth video file, and the trajectory of the third input is associated with a screen identifier of the sixth video file.

10. The video playback method according to claim 2, wherein the first input comprises at least two sub-inputs; and the playing the K video files on the K screens in response to the first input comprises:

sequentially playing the K video files on the K screens in response to the at least two sub-inputs according to playback parameters corresponding to the at least two sub-inputs, wherein the playback parameters comprise at least one of the following: a playback sequence, playback duration, a playback start position, and a playback end position.

11. The video playback method according to claim 1, wherein before the obtaining M video files and configuration information of the M video files, the video playback method further comprises:

receiving a fourth input by a user, wherein the fourth input is an input on a fourth screen, the fourth screen is any one of the N screens, and the fourth input is used for triggering the first terminal device to perform screen recording; and recording M screens in the N screens in response to the fourth input, wherein M is less than or equal to N.

12. The video playback method according to claim 11, wherein the recording M screens in the N screens in response to the fourth input comprises:

determining the M screens from the N screens, and recording the M screens in response to the fourth input.

13. The video playback method according to claim 11, wherein after the recording the M screens, the video playback method further comprises:

generating the configuration information according to target information obtained by recording the M screens, wherein the target information comprises screen identifiers of the M screens, and the M video files obtained by recording the M screens.

14. The video playback method according to claim 1, wherein before the obtaining M video files and configuration information of the M video files, the video playback method further comprises:

receiving the M video files and the configuration information that are sent by a second terminal device; and storing the M video files and the configuration information in the first terminal device.

15. The video playback method according to claim 1, wherein before the obtaining M video files and configuration information of the M video files, the video playback method further comprises:

obtaining a historical record that the first terminal device plays the M video files, wherein the historical record comprises screen identifiers of the M video files;

determining the configuration information of the M video files according to the historical record; and storing the M video files and the configuration information in the first terminal device.

16. A multi-screen terminal device, comprising N screens, a processor, a memory, and a computer program stored in the memory and executable on the processor, wherein the computer program, when executed by the processor, causes the processor to perform operations comprising:

obtain M video files and configuration information of the M video files, wherein the M video files are generated by the multi-screen terminal device through screen-recording M screens among the N screens, and the configuration informatin of the M video files comprises a correspondence relationship between each of the M video files and a screen identifier identifying a corresponding physical screen among the M screens of the multi-screen terminal device that is recorded to generate the video file; and play K video files in the M video files on K screens among the N screens according to the configuration information of the M video files, wherein both N and K are positive integers, and M is an integer greater than or equal to 2, wherein the N screens, the M screens, and the K screens are all individual physical screens of the first multi-screen terminal device.

17. The terminal device according to claim 16, wherein to play the K video files in the M video files on the K screens in the N screens according to the configuration information, the processor is further configured to:

separately display one video card on each of the K screens according to the configuration information, wherein the video card displayed on each screen is used for indicating one of the K video files, and a video file indicated by a video card displayed on one screen corresponds to a screen identifier of the one screen; and receive a first input that is performed on a first target screen in the K screens by a user, and play the K video files on the K screens in response to the first input.

18. The terminal device according to claim 17, wherein the processor is further configured to:

receive a second input by a user, wherein the second input is an input on a first screen, and the first screen is any one of the K screens; and update, in response to the second input, a video card displayed on a second target screen, wherein the second target screen comprises at least one of the K screens.

19. The terminal device according to claim 18, wherein the second target screen is the first screen, and to update the video card displayed on the second target screen, the processor is further configured to:

update a first video card displayed on the first screen to a second video card, wherein the first video card is used for indicating a first video file, the second video card is used for indicating a second video file, and the second video file is a video file except the K video files in the M video files.

20. A non-transitory computer-readable storage medium, wherein the computer-readable storage medium stores a computer program, and the computer program, when executed by a processor, implements a video playback method that comprises:

obtaining M video files and configuration information of the M video files, wherein the M video files are generated by a multi-screen terminal device through screen-recording M screens among the N screens, and the configuration information of the M video files comprises a correspondence relationship between each of the M video files and a screen identifier identifying corresponding physical screen among the M screens of the multi-screen terminal device that is recored to generate the video file; and playing K video files in the M video files on K screens among the N screens according to the configuration information of the M video files, wherein both N and K are positive integers, and M is an integer greater than or equal to 2, wherein the N screens, the M screens, and the K screens are all individual physical screens of the first multi-screen terminal device.

* * * * *